United States Patent
Robinson et al.

(10) Patent No.: US 8,538,272 B1
(45) Date of Patent: Sep. 17, 2013

(54) DATA SECURITY IN OPTICAL COMMUNICATIONS SYSTEMS

(75) Inventors: Alan Robinson, Harlow (GB); Adrian Sparks, Ongar (GB); Robin Rickard, Spellbrook (GB)

(73) Assignee: Ciena Corporation, Hanover, MD (US)

( * ) Notice: Subject to any disclaimer, the term of this patent is extended or adjusted under 35 U.S.C. 154(b) by 1928 days.

(21) Appl. No.: 10/829,545

(22) Filed: Apr. 22, 2004

(51) Int. Cl.
*H04B 10/00* (2013.01)
*H04B 10/04* (2011.01)

(52) U.S. Cl.
USPC ............ 398/158; 398/187; 398/199; 398/201

(58) Field of Classification Search
USPC ........... 398/147, 162; 380/54, 256; 398/140, 398/141, 147, 149, 158, 159, 162
See application file for complete search history.

(56) References Cited

U.S. PATENT DOCUMENTS

| | | | | |
|---|---|---|---|---|
| 5,161,044 | A * | 11/1992 | Nazarathy et al. | 398/194 |
| 5,864,625 | A * | 1/1999 | Rutledge | 380/31 |
| 6,583,906 | B1 * | 6/2003 | Schemmann et al. | 398/158 |
| 6,687,466 | B1 * | 2/2004 | Chiappetta | 398/193 |
| 2001/0021252 | A1 * | 9/2001 | Carter et al. | 380/247 |
| 2001/0035997 | A1 * | 11/2001 | Agazzi | 359/173 |
| 2004/0067064 | A1 | 4/2004 | McNicol | |

OTHER PUBLICATIONS

Salamon, "Secure Optical COmmunications Utilizing PSK Modulation, Polarization, Multiplexing and Coherent Digital Homodyne Detection with Wavelength and Polarization Agility", Milcom 2003, nine pages.

* cited by examiner

*Primary Examiner* — Kenneth N Vanderpuye
*Assistant Examiner* — Abbas H Alagheband
(74) *Attorney, Agent, or Firm* — Muncy, Geissler, Olds & Lowe, PLLC

(57) ABSTRACT

A method of encrypting an optical communications signal involves determining an encryption function, filtering an electrical input signal using the encryption function to generate an encrypted electrical signal, and modulating an optical source using the encrypted electrical signal to generate a corresponding encrypted optical signal. This is then transmitted through an optical communications system. The encryption is selected such as to substantially remove symbol definition from the optical signal. This method provides digital signal processing of an electrical input signal in order to derive a signal for controlling an optical modulator in such a way that the optical signal transmitted over the link is a continuous analogue signal rather than a series of discrete symbols which alternate between well-defined signal values. This makes it difficult for a third party to derive the binary bit sequence encoded by the optical signal.

23 Claims, 6 Drawing Sheets

DATA SECURITY IN OPTICAL COMMUNICATIONS SYSTEMS

FIELD OF THE INVENTION

The present invention relates to optical communications systems, and in particular to data security within such systems.

BACKGROUND OF THE INVENTION

The security afforded to the data being transmitted between the communicating parties is an important consideration when selecting a communications network. Security here refers to the ease with which an unwanted third party can intercept a communication and render it intelligible. In the most security conscious applications a layered approach is taken to security with encryption applied at multiple points within the network, at multiple layers of the OSI stack. Thus all layers of encryption have to be compromised by the eavesdropper before the message can be recovered. For example information may be encrypted at the SONET/SDH (OSI layer 1) in a transmission network and again at higher layers using techniques such as IPSec (OSI layer 3) or TLS (Transport Layer Security, OSI layer 7). In packet based security schemes the packet source and destination is necessarily visible to allow routing within the network core. This address visibility allows traffic analysis based on packet addresses to take place. This can be used to detect events, such as increased traffic along a route, which may give away information the communicating parties may wish to keep secret. For this reason there is value in implementing lower layer security, even in a network where strong packet based security is present. The present invention provides a technique for adding cost effective protection at the most basic layer of the network. This can be used on its own or in conjunction with security at higher layers within the network.

The first step in the process of eavesdropping is to intercept the communication. In this respect electrical or optical point to point communication offers a degree of physical security in that the cable first has to be accessed. However cable routes are often long and the tapping of electrical or optical cables is not difficult once access is obtained. Signals in the physical layer always have to be regarded as analogue in nature, even if their source is digital. The transmitted signal will be distorted by transmission impairments, such as dispersion, and the recovered signal will always include some amount of noise not present at the transmitter. The ideal is to quickly convert this analogue signal back into the transmitted digital bit stream. Once in the digital domain the signal can be easily stored and subject to cryptanalysis to discover the keys to higher layers of coding. The present invention provides a technique for frustrating the recovery of digital information from the analogue signal present in the cable providing a layer of security not commonly present in networks today. The technique is of particular value in high rate optical transmission, but could also be applied to electrical or optical transmission at any rate.

SUMMARY OF THE INVENTION

According to the invention, there is provided a method of encrypting an optical communications signal to be conveyed across an optical link within an optical communications system, the method comprising:

filtering an input data signal using an encryption function to generate an encrypted electrical signal; and modulating an optical source using the encrypted electrical signal to generate a corresponding encrypted optical signal for transmission through the optical communications system, wherein the encryption is selected such as to substantially remove symbol definition from the optical signal.

Conventional intensity modulated optical transport systems are designed to transmit an optical power envelope comprising a sequence of pulses in which binary data are represented by transitions between two discrete power levels. Square law detection and low pass filtering in the receiver generates an electrical waveform which a simple voltage discriminator converts into a binary data sequence. The discriminator or slicer output is a logical '1' if the signal is greater than some threshold and a '0' if the signal is less than the threshold. Multi-level coding schemes have been proposed, but are more sensitive to noise than a binary modulation scheme, and are not yet widely deployed. The invention described here applies equally to binary and to multi-level modulation schemes. The discrete states of binary or multi-level coding schemes are collectively referred to in the present document as symbols. In general, symbols may be defined in amplitude (i.e. power) and/or phase.

The method of the present invention provides digital signal processing of an electrical input signal in order to derive a signal for controlling an optical modulator in such a way that the optical signal transmitted over the link is a continuous analogue signal rather than a series of symbols with discrete states which alternate between well-defined signal values. This makes it difficult for a third party to derive the digital bit sequence encoded by the optical signal.

If it is not possible to quickly convert the intercepted signal into the correct digital bit sequence, cryptanalysis is possible but, at high bit rates, considerably more difficult. The signal in the cable will have to be recorded as an analogue quantity with a sample rate higher than the bit rate. This can result in an order of magnitude or greater increase in the quantity of data to be stored and processed offline to recover the original bit stream. This is particularly difficult for the case of long haul fiber optic cables where the bit rate is often near the maximum that can be handled by the technology available. At these rates providing storage of sufficient bit rate, capacity and accuracy can be difficult.

The method essentially involves digital electrical pre-processing of the signal before conversion into the optical domain. The method may further comprise determining a compensation function that substantially mitigates the chromatic dispersion imparted to the communications signal by the optical communications system, and wherein filtering the electrical input signal then further uses the compensation function to generate an encrypted predistorted electrical signal. The pre-processing may thus also be used for chromatic dispersion compensation for the link characteristics.

At the present time there is an increase in the electrical processing power available at the optical long haul line rate. One way this enhanced capability can be used is to process the received waveform to remove optical transmission impairments, such as dispersion, through electrical processing rather than by optical means, such as dispersion shifted fiber. The present invention may re-use electrical processing equipment used to remedy optical transmission impairments to additionally encrypt and decrypt the signal on the fiber providing physical layer security for a small increase in system complexity. This ability to cost effectively implement a receiver combining impairment compensation and security adds to the value of the invention but the techniques could be implemented solely for the purpose of security if required.

The step of determining a compensation function may comprise measuring a performance parameter related to the optical dispersion and calculating respective values of one or more parameters of the compensation function that optimizes the measured performance parameter. For example, the parameter may be net chromatic dispersion at one or more wavelengths, a bit error rate, a signal-to-noise ratio, an eye-opening ratio, a stimulus response, or a probability distribution.

The digital filtering may be performed in a number of ways, for example using any one of a Fast Fourier Transform (FFT) filter, a Finite Impulse Response (FIR) filter, and a Infinite Impulse Response (IIR) filter.

The filtering may calculate successive numerical values of the encrypted signal, based on the electrical input signal and the encryption function and convert each successive numerical value into a corresponding analog value of the encrypted signal. The encrypted signal can be represented by two or more orthogonal components, and the step of calculating successive numerical values of the encrypted signal then comprises a step of calculating successive corresponding values of each component.

dispersion compensated electrical signal.

The invention also provides a method of decrypting an optical communications signal which has been conveyed across an optical link within an optical communications system, the method comprising:
  receiving an encrypted optical signal having no symbol definition;
  converting the received encrypted optical signal into an electrical signal; and
  decrypting the electrical signal by filtering using an inverse of an encryption function which had been used in the transmission of the optical signal.

The encryption and decryption methods of the invention can be used in an optical transmission method, by transmitting the encrypted optical signal over an optical communications link, receiving the transmitted encrypted optical signal, converting the received encrypted optical signal into an electrical signal, and decrypting the electrical signal by filtering using an inverse of the encryption function.

In this transmission method, compensation for chromatic dispersion as well as other effects, such as non-linear effects, can be implemented by the digital filtering in the transmitter, in the receiver or by the combinatory effect of the digital filtering in the transmitter and receiver.

The invention also provides an optical transmitter for encrypting an optical communications signal to be conveyed across an optical link within an optical communications system, comprising:
  a transmitter digital filter for filtering an electrical input signal using an encryption function to generate a encrypted electrical signal;
  an optical modulator for modulating an optical source using the encrypted electrical signal to generate a corresponding encrypted optical signal for transmission through the optical communications system, wherein the encryption is selected such as to substantially remove binary pulse definition from the optical signal.

This transmitter uses digital signal processing of an electrical input signal in order to derive a signal for control an optical modulator in such a way that the optical signal transmitted over the link is a continuous analogue signal rather than a series of discrete pulses. The transmitter preferably further comprises a processor adapted to determine the encryption function.

The invention also provides an optical receiver for decrypting an optical communications signal which has been conveyed across an optical link within an optical communications system, comprising:
  a receiver for receiving an encrypted optical signal having no symbol definition;
  an opto-electric converter for converting the received encrypted optical signal into an electrical signal; and
  a receiver digital filter for filtering the electrical signal using an inverse of an encryption function which had been used in the transmission of the optical signal.

The transmitter and receiver of the invention are preferably used in an optical communications system comprising an optical link between the transmitter and receiver.

The system preferably also comprises a processor adapted to determine a compensation function that substantially mitigates the chromatic dispersion imparted to the communications signal by the optical communications system. This compensation function can be implemented by the transmitter digital filter or the receiver digital filter or by these filters in combination. For example each filter may compensate for the chromatic dispersion resulting from a portion of the optical link.

In another aspect, the invention provides an optical communications signal for transmission over an optical communications link, comprising an optically modulated representation of an encrypted electrical signal, the encryption being such that there is no symbol definition in the optical signal.

BRIEF DESCRIPTION OF THE DRAWINGS

Examples of the invention will now be described in detail with reference to the accompanying drawings, in which.

It will be noted that throughout the appended drawings, like features are identified by like reference numerals.

DETAILED DESCRIPTION OF THE PREFERRED EMBODIMENT

Figure 1A:
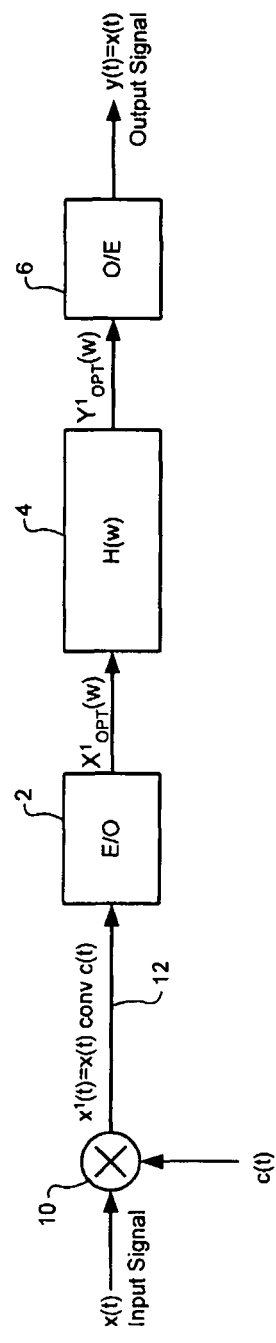
FIGS. 1a and 1b are block diagrams schematically illustrating transmission of an input data signal through an optical communications system in accordance with the present invention.

The Assignee has proposed (but not yet published) a system which enables the characteristics of an optical signal to be varied by digital processing of the original electrical signal, in the electrical domain. This ability to pre-process or post-process an optical signal in the electrical domain has been proposed in order to enable compensation of optical distortions, most notably chromatic dispersion.

Optical communications systems typically include a pair of network nodes connected by an optical waveguide (i.e., fiber) link. Within each network node, communications signals are converted into electrical signals for signal regeneration and/or routing, and converted into optical signals for transmission through an optical link to another node. The optical link between the network nodes is typically made up of multiple concatenated optical components, including one or more (and possibly 20 or more) optical fiber spans (e.g., of 40-150 km in length) interconnected by optical amplifiers.

The use of concatenated optical components within a link enables improved signal reach. Optical signals are progressively attenuated as they propagate through a span, and amplified by an optical amplifier (e.g., an Erbium Doped Fiber Amplifier—EDFA) prior to being launched into the next span. However, signal degradation due to noise and dispersion effects increase as the signal propagates through the fiber. Consequently, noise and dispersion degradation become significant limiting factors of the maximum possible signal reach.

Mathematically, first order dispersion is the derivative of the group delay of the optical path with respect to wavelength. The fibre dispersion coefficient is measured in picoseconds arrival time change per nanometer change in optical wavelength per kilometer length (ps nm$^{-1}$ km$^{-1}$). The net dispersion (ps nm$^{-1}$) in the link is given by integrating the dispersion coefficient over the length of the link. The magnitude of waveguide and material dispersions both vary with wavelength, and at some wavelengths the two effects act in opposite senses. The amount of dispersion present in a link can also vary with the temperature of the cable, and if the route is changed (e.g., using optical switches). Dispersion in optical fibers presents serious problems when using light sources whose spectrum is non-ideal, for example broad or multispectral-line, or when high data rates are required, e.g., over 2 GB/s.

One commonly used method of addressing the problem of dispersion in high-bandwidth communications systems is by inserting one or more optical dispersion compensators within a link. Such dispersion compensators may, for example, take the form of length of fiber, a Mach-Zehnder interferometer, an optical resonator, or a Bragg reflector. Some of these compensators can also produce a controllable amount of compensation, which enables mitigation of time-variant dispersion effects. In either case, these compensators are intended to at least partially offset the signal distortions introduced by the system transfer function. The compensation function is a dispersive function that is selected to optimize performance of the link.

In a fully linear system, the compensation function would preferably be equivalent to the complex conjugate of the optical link transfer function, so that the combined effect would be an undistorted received signal that exactly corresponds to the original optical signal. However, limitations of optical components, and the time-varying amount of compensation required, make this objective very difficult to achieve. Additionally, optical compensators are expensive and introduce significant optical losses. These losses must be offset by means of additional optical gain which introduces more optical noise. The additional (or higher-performance) optical amplifiers required to provide this increased gain further increase the total cost of the communications system. In addition, the presence of optical dispersion compensators and high performance amplifiers distributed along the length of the link provides a significant technical barrier to system evolution. For example, implementation of optical switching (e.g. at the transmitter and/or receiver ends of the link, or an intermediate site without electrical termination) necessarily requires adjustment of optical amplifiers, in order to accommodate changing energy states within the link.

These problems can be alleviated by moving the compensation function to the terminal ends of the link. This technique typically involves "preprocessing" the input signal at the transmitter end of the link to improve dispersion tolerance, and/or processing the output signal detected at the receiver end of the link to accurately detect the input signal within the distorted output signal.

For example, high bandwidth traffic can be distributed over a larger number of lower-rate channels. The reduced bit-rate of each channel enhances the dispersion tolerance in proportion to the square of the reduction in the bit-rate. However, this approach is expensive, spectrally inefficient, and creates four wave mixing problems.

It is known that the use of a coherent receiver enables the signal degradation due to dispersion to be removed via linear electrical filtering. However, because of their high cost, very few coherent optical receivers have been installed, and the cost of replacing installed receivers with the high-performance coherent receivers is prohibitive.

The majority of receivers installed in modern optical communications networks are of the direct detection type. Due to the well known squaring effect in these receivers, electrical processing of the output signal is capable of compensating only a very limited amount of dispersion.

The alternative system proposed by the Assignee is for compensating optical dispersion and other optical degradation of a communications signal conveyed through an optical communications system. A compensation function is determined that substantially mitigates the chromatic dispersion imparted to the communications signal by the optical communications system. The communications signal is then modulated in the electrical domain using the compensation function.

This approach takes advantage of high speed digital electronic circuitry now available which can operate at speeds sufficient to control the modulation of an optical carrier at rates higher than the optical bit rate, in order to implement pre- or post-compensation. In providing compensation for chromatic dispersion and non-linear distortion, the method can be implemented at either the transmitter or receiver ends of the communications system, or may be divided between both ends, as desired.

In the present invention for secure transmission, high speed electronic processing is required at both transmitter and receiver. Preferably, multiple substantially orthogonal components of the optical waveform are sampled. This is preferably implemented using coherent detection, but alternative methods may be used. For instance, Mach-Zehnder interferometers, can be made sensitive to changes in the phase of the waveform. Either a single interferometer is combined with a conventional (intensity) detector, or two interferometers with complementary phase responses are employed. Substantially orthogonal signal components can be generated by linear or non-linear combinations of the detected signals.

When the method is implemented in the transmitter, predistortion is applied using digital filtering based on a compensation function to generate the predistorted signal from the original electrical input signal. The predistorted signal is then used to modulate an optical source to generate a corresponding predistorted optical signal for transmission through the optical communications system. The predistorted signal can then incorporate compensation for dispersion and component non-linearities throughout the system. Consequently, dispersion compensation can be effectively implemented independently of the type of detection (i.e. direct or coherent) used in the receiver.

When the method is implemented in the receiver, the received optical signal is converted into a corresponding received electrical signal, which includes distortions due to dispersion imparted on the optical signal by the optical communications system. Preferably, two or more orthogonal components of the signal are detected. The received electrical signal components are then sampled (e.g. using one or more analog-to-digital converters) and digitally filtered using the compensation function to generate an output electrical signal which is a substantially undistorted version of the original communications signal.

The system proposed by the Assignee for providing digital electrical processing for compensation of optical effects will first be described. This invention uses the capability provided by the proposed system in order to implement security at the physical layer, and this will be described after an initial discussion of the system.

Figure 1B:
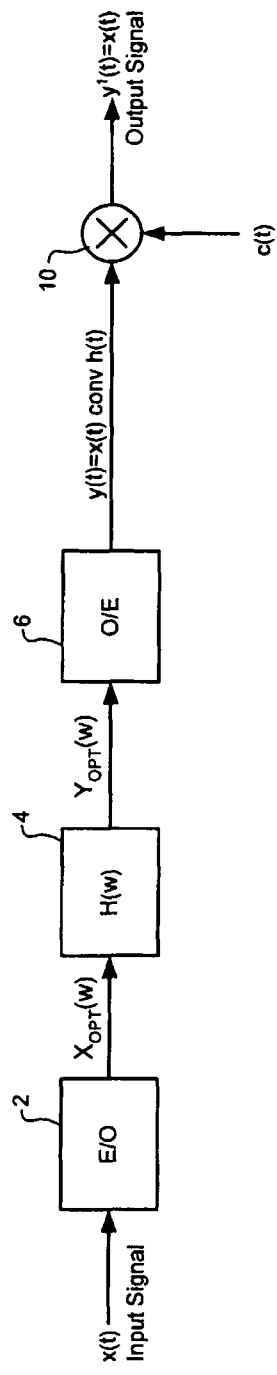

FIGS. 1a and 1b are block diagrams schematically illustrating principal operations of the proposed system for providing chromatic dispersion compensation. FIG. 1a shows an embodiment in which dispersion compensation is implemented at the transmitting end of the communications system. Conversely, FIG. 1b illustrates an embodiment in which dispersion compensation is implemented at the receiving end of the communications system.

Figure 2:
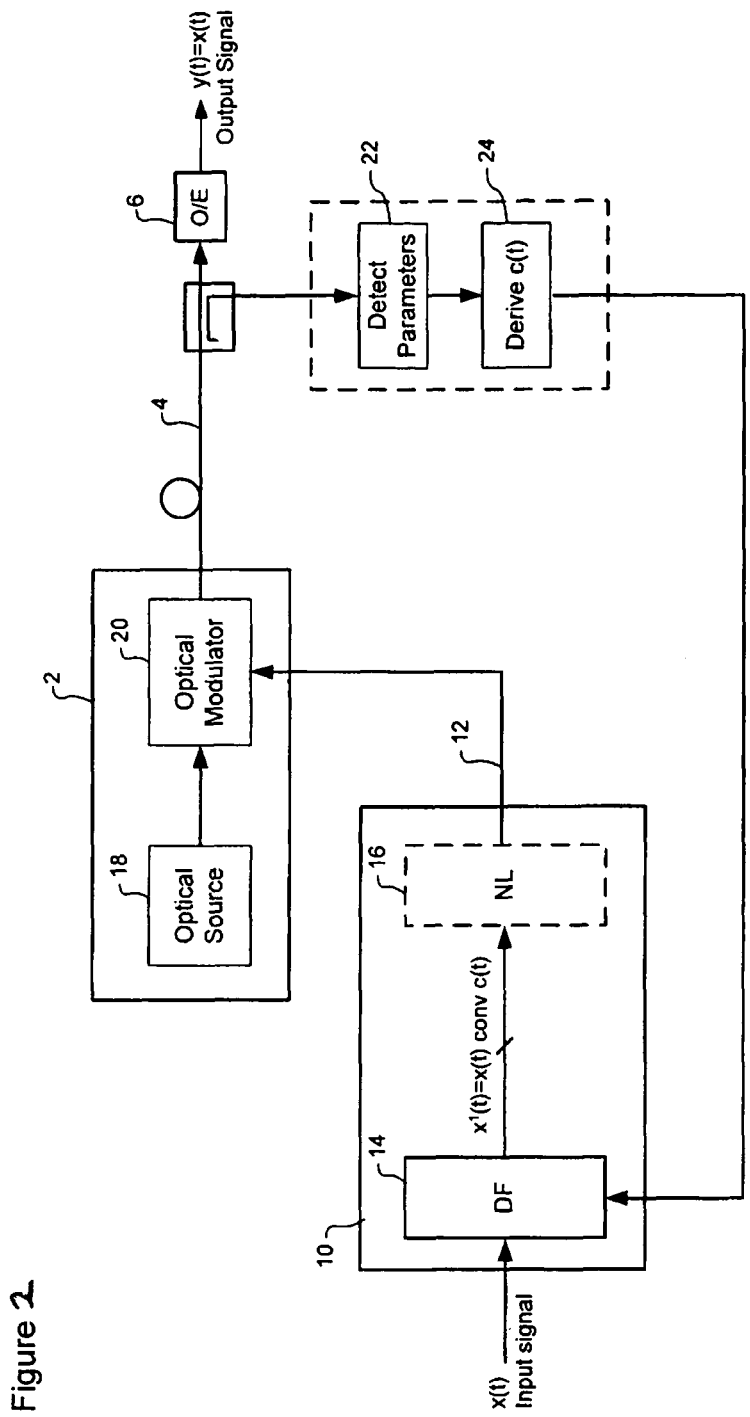
FIG. 2 is a block diagram schematically illustrating principal components and operations of a compensation modulator used in the system of FIG. 1.

As shown in FIG. 1a, the optical communications system is represented by electrical-to-optical (E/O) and optical-to-electrical (O/E) converters 2 and 6 separated by an optical link 4 represented by a system transfer function H(w). In order to simplify the present description, the E/O and O/E converter blocks 2 and 6 shown in FIG. 2 are considered to be ideal, in the sense that they do not introduce any signal distortions that are not otherwise accounted for by the system transfer function H(w). Signal distortions introduced by the system transfer function are compensated by deriving a compensation function c(t) that optimizes system performance. For chromatic dispersion, for example, the compensation function c(t) will be equivalent to the complex conjugate H*(w) of the system transfer function H(w).

In non-linear systems, the compensation function c(t) will be non-linear, but in all cases, the compensation function is selected to optimize system performance. A compensation filter 10 uses the compensation function c(t) to filter the input signal x(t) in the electrical domain, thereby producing a pre-distorted input signal $x^1(t)$ 12 given by:

$$x^1(t) = x(t) \text{conv } c(t)$$

where "conv" is the convolution operation between x(t) and c(t).

The predistorted input signal $x^1(t)$ 12 is then converted to a corresponding predistorted optical signal $X^1_{OPT}(w)$ by the E/O converter 2 and transmitted through the optical link 4 to the receiver. Within the receiver, the incoming optical signal $Y^1_{OPT}(w)$ is converted by the O/E converter 6 into a corresponding output signal y(t). As may be seen in FIG. 1, the received optical signal $Y^1_{OPT}(w)$ is the predistorted optical signal $X^1_{OPT}(w)$ multiplied by the transfer function H(w) of the optical communications system. Because the distortions introduced by the compensation function c(t) exactly counterbalance those introduced by the system transfer function H(w), the output signal y(t) generated by the O/E converter will be a substantially undistorted version of the original input data signal x(t). Thus, a technique of compensating optical distortions impressed upon optical signals traversing the optical link 4 is provided, by predistorting the input data signal x(t) within the electrical domain at the transmitting end of the optical link 4. Because distortion compensation is accomplished in the electrical domain, a substantially arbitrary compensation function c(t) can be implemented, thereby facilitating effective compensation of even severe optical dispersion.

FIG. 2 is a block diagram schematically illustrating principal elements and operations of a first example of compensation modulator 10. As shown in FIG. 2, the input signal x(t) is filtered by a digital filter 14 which accepts the compensation function c(t) as an input. Various known digital filter types may be used to implement the digital filter 14, such as, for example, Finite Impulse Response (FIR) filters, Infinite Impulse Response (IIR) filters, and Fast Fourier Transform (FFT filters). Alternatively, the digital filter 14 may be implemented using a Random Access Memory Look-up Table (RAM LUT), as will be described in greater detail below. In either case, the digital filter 14 generates the predistorted signal $x^1(t)$ 12, which compensates chromatic dispersion due to the system transfer function H(w).

The predistorted signal $x^1(t)$ 12 can then be converted into the corresponding predistorted optical signal $X^1_{OPT}(w)$ by means of a conventional electrical to optical converter 2. For example, in the illustrated embodiment, electrical to optical conversion is accomplished using a tuned optical source 18 such as a narrow band laser coupled to a conventional optical modulator 20. In this case, the predistorted signal 12 can be used as an input to control the optical modulator 20 in a manner known in the art.

Various methods may be used to derive the compensation function c(t). In the example of FIG. 2, the optical signal $Y^1_{OPT}(w)$ at or near the receiver end of the optical link 4 is monitored (at 22) in order to detect signal quality parameters indicative of dispersion in the optical communications system. In preferred embodiments, the signal quality parameters comprise a direct measurement of dispersion as a function of wavelength across the wavelength band of interest. However, other signal quality parameters such as, for example, the bit error rate or eye closure may be used a proxies for the dispersion. Any of the signal quality parameters may be detected based on an optical signal obtained by tapping the optical link 4 as shown in FIG. 2, or alternatively by analysis of the output signal y(t) generated by the E/O converter 6. A compensation function c(t) which optimizes the detected parameters can then be derived (at 24) deterministically and/or adaptively, using known techniques.

The functional step of deriving the compensation function c(t) can be implemented by any suitable combination of hardware and software, which may be co-located with the receiver, the transmitter, or any other location. In embodiments in which the detected parameters comprise direct measurement of dispersion, the compensation function c(t) can be calculated to minimize (and preferably eliminate) the total dispersion. Where bit error rate and/or eye closure are used as proxies, then the compensation function c(t) would be calculated to optimize these respective values.

The optical modulator 20 can be assumed to be fully linear, so that the modulator 20 does not introduce any further distortions beyond those accounted for by the system transfer function H(w). Depending on how the system transfer function H(w) is defined, this approach may yield satisfactory results. However, in many cases it may be desirable to treat the transfer function of the optical fiber span 4 separately from that of the optical modulator 20 and the optical-to-electrical converter 6 in the receiver. In this case, the compensation function c(t) calculated above will not account for distortions introduced by the optical modulator 20 or the optical-to-electrical converter 6. However, the performance of these components is typically well characterized. It is therefore possible to implement a non-linear compensator 16 in order to further distort the predistorted signal 12 in such a manner as to fully compensate non-linearities of the optical modulator 20 and/or the O/E converter 6, as desired. The non-linear compensator 16 can be implemented as a nonlinear digital filter, such as an LUT or nonlinear multiplier.

The system may also be used to compensate for other non-linear effects. Of particular concern in considering non-linear processes are the effects of phase nonlinearities, which increase as data rates and optical power levels increase, and which ultimately limit both system performance and signal reach.

Phase nonlinearities are the result of complex interactions between the optical power present in the fiber, the refractive index of the fiber medium, the wavelength-division-multiplexing (WDM) channel spacing, the polarization states of the signals within each of the channels, and the proximity of channel wavelengths to the zero-dispersion wavelength of the fiber. Phase nonlinearities include self-phase modulation (SPM), cross-phase modulation (XPM), and modulation-instability (MI).

Various methods may be used to determine a compensation function which also compensates for these effects. By monitoring the signal at or near the receiver, signal quality parameters can be obtained indicative of non-linear and cross-channel effects of the optical link 4. For example, direct measurements of SPM, XPM, MI, four-wave mixing and cross-talk across the wavelength band of interest can be taken. Methods of measuring SPM, XPM, MI, four-wave mixing and cross-talk are known in the art.

Methods for measuring these parameters in installed networks are disclosed in, for example, U.S. Pat. No. 6,128,111. For example, XPM between a pair of channels can be measured by launching a probe signal through a first channel, while a data signal is simultaneously transmitted through the other channel. As the two signals co-propagate through the link 4, XPM between the channels generates a test signal which is received, by the receiving node 4b, through one of the channels. Correlation between the received probe and test signals enables computation of an XPM transfer function, which models XPM-induced signal distortions impressed on signal traffic traversing the link.

In many cases, SPM can be described as a function of XPM, because the mechanisms involved in producing both XPM and SPM are related. Consequently, for any particular optical communications system, a look-up table can be defined for estimating SPM from the detected XPM. The data used to populate the look-up table may, for example, be based on experimental data obtained during the set-up and commissioning of the optical communications system. If desired, the look-up table data may be updated, e.g., using fresh experimental data obtained during maintenance of the optical communications system to accommodate migration of the optical component performance.

Alternatively, a data signal arriving at the receiving node can be monitored to detect variations in signal noise with dispersion. This provides a direct indication of total XPM- and SPM-induced signal distortions, but does not enable these effects to be separated.

Figure 3:
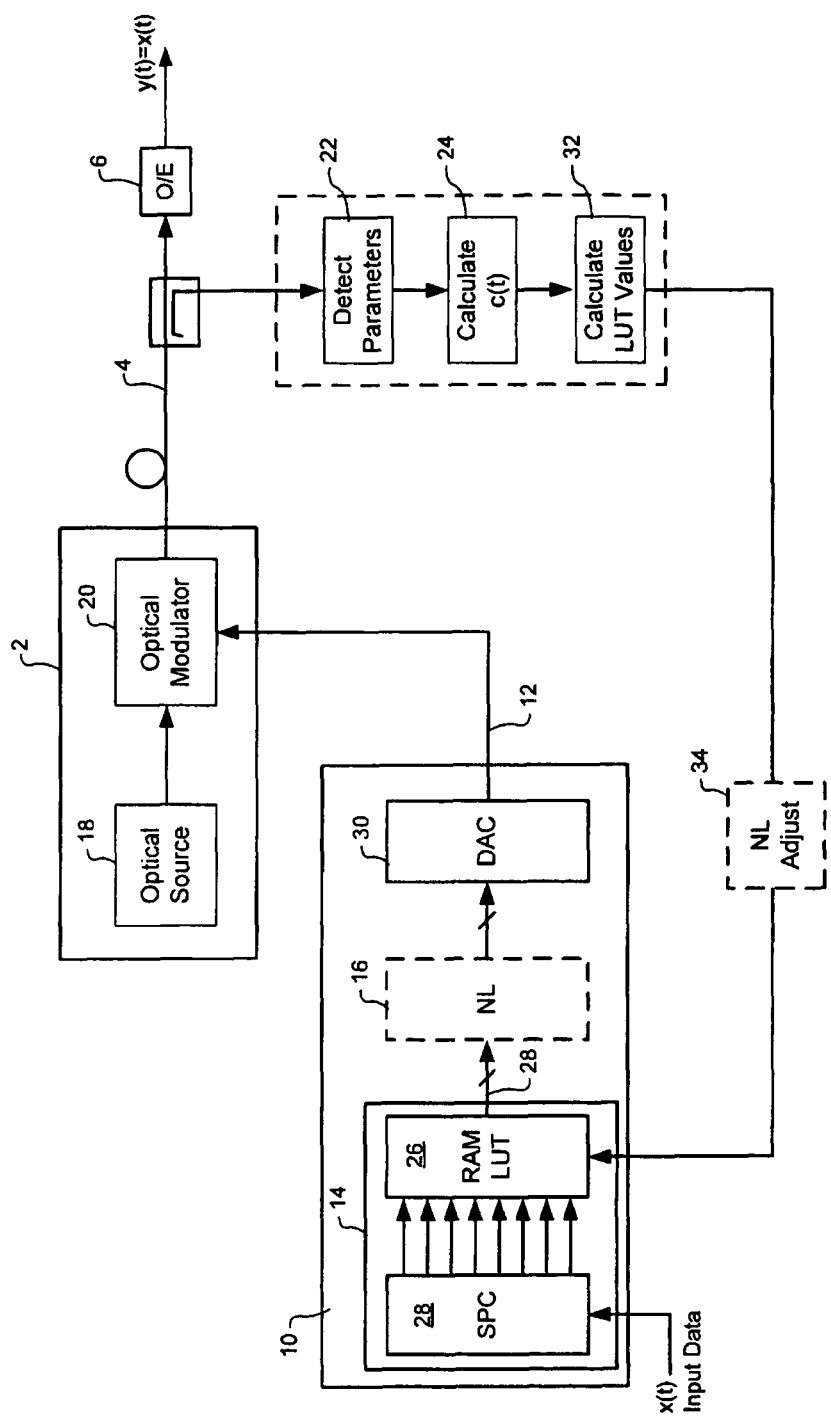
FIG. 3 is a block diagram schematically illustrating principal components and operations of an alternative compensation modulator used in the system of FIG. 1.

As mentioned above, the digital filter 14 may be implemented in a variety of ways. FIG. 3 schematically illustrates an embodiment in which the digital filter 14 is implemented using a RAM LUT 26. This technique exploits the fact that the input signal x(t) is a substantially undistorted binary signal, in which successive bits can be unambiguously discriminated. This greatly simplifies the problem of digitally filtering the input signal x(t), because a direct relationship can be defined between the input signal x(t) and the predistorted signal $x^1(t)$ 12.

As shown in FIG. 3, successive bits of the input signal x(t) are latched through a serial-to-parallel converter 28 (e.g., a shift register) which converts the serial bit stream into a parallel bit stream having a width of N bits. In the illustrated embodiment N=8, it being understood that other values of N may be used as desired. The parallel data stream is then used to access a random access memory (RAM) look-up table 26 having $2^N$ registers (not shown).

Because the RAM LUT 26 performs a substantially linear filtering function, it is possible to construct the LUT 26 as a set of two or more Random Access Memory blocks (not shown), if desired. In this case, each RAM block stores a respective portion of the desired numerical valve 28 of the predistorted signal component. Thus the outputs generated from each RAM block can be summed, in a conventional manner, to produce the desired numerical valve 28. This arrangement allows the LUT 26 to be larger than can conveniently be accommodated within a single RAM block.

Each register of the look-up table 16 contains at least one digital number representing the analog value of the predistorted signal $x^1(t)$ 12, which has been previously calculated for a unique set of N bits. Accordingly, as the input serial bit stream is latched through the serial-to-parallel converter 14, a stream of successive digital values 28 of the predistorted signal 12 are output from the look-up table 16. This stream of digital values 28 can then be converted into the corresponding analog predistorted signal $x^1(t)$ 12 using a digital-to-analog converter 30. The analog predistorted signal $x^1(t)$ 12 can then be converted into the corresponding predistorted optical signal $X^1_{OPT}(w)$ by means of a conventional electrical to optical converter 2, as described above.

Various methods may be used to calculate each of the digital values stored in the look-up table 16. In the example of FIG. 3, the optical signal at or near the receiver end of the optical link 4 is monitored (at 22) to detect signal quality parameters and a compensation function c(t) which optimizes the detected parameters derived (at 28), as described above with respect to FIG. 2.

Because chromatic dispersion causes a time domain distortion of an input signal, the instantaneous value of the analog predistorted input signal 12 at a particular instant (t) will necessarily be a function of the analog waveform of the input data signal x(t) within a time window that brackets the instant in question. The width of the time window, measured in symbols, will generally be a function of the maximum dispersion (D) for which compensation is to be provided; the bandwidth (B) of the optical signal; and the symbol interval (S) of the optical signal. For example, consider an optical communications system in which the transmitter generates an optical signal having a bandwidth of B nanometers and a symbol interval of S picoseconds/symbol. In this case, the maximum dispersion (D) that can be compensated is given by the equation:

$$D = N \cdot \frac{S}{B},$$

where N is the width of the time window, measured in symbols. It will be appreciated that the selected value of N will limit the maximum dispersion (D) that can be effectively compensated. In general, the value of N will be selected based on the expected maximum dispersion of the optical communications system.

In the example of FIG. 3, the look-up table uses N=8 successive bits of the input signal x(t) to reference successive values of the predistorted signal. In this case, the time window used for calculating each value of the predistorted signal spans a total of N=8 symbols, so that the total dispersion that can be compensated by the system of FIG. 2 will be given by:

$$D = 8 \cdot \frac{S}{B}$$

Following the discussion above, it will be seen that each value stored in the look-up table 16 can readily be calculated (at 32) by applying the calculated compensation function to each one of the $2^N$ possible N-bit sequences. For each N-bit sequence, the calculated look-up table value would then be stored in the RAM look-up table 16 register that is indexed by the N-bit sequence in question. This process will result in the look-up table 16 being loaded with pre-calculated values of the predistorted signal 12 which will be accessed, in sequence, as successive bits of the input data signal x(t) are latched through the serial-to-parallel converter 14.

In some instances, it may be advantageous to arrange the RAM LUT 26 to output more than one numerical value 18 of the predistorted signal 12 for each symbol of the input signal x(t). This can readily be accomplished by calculating the required numerical values 18 for each N-bit sequence, and storing the resulting set of numerical values in the appropriate register. Consequently, as each bit of the input signal x(t) is latched through the serial-to-parallel converter 28, all of the numerical values calculated for each unique N-bit sequence will be output, in an appropriate sequence, from the RAM LUT 26.

As may be seen in FIG. 3, the non-linear compensator 16 may be implemented as a second look-up table positioned between the dispersion compensation look-up table 26 and the digital-to-analog converter 30. Alternatively, the look-up table values calculated (at 32) using the compensation function c(t) can be adjusted (at 34) based on the known non-linearities of the optical modulator 20 and/or optical-to-electrical converter 6. In this case, values 28 obtained by accessing the RAM look-up table 26 will combine compensation for both dispersion and nonlinearities.

In the embodiments of FIGS. 2 and 3, a single compensation modulator path is provided for generating the predistorted signal $x^1(t)$ 12 based on the input signal x(t). As will be appreciated, such an arrangement is suitable for modulating a single dimension (e.g., either amplitude or phase) of the input data stream x(t). Accordingly, the predistorted signal $x^1(t)$ 12 of the embodiments of FIGS. 2 and 3 will comprise an amplitude or phase modulated version of the original input data stream x(t). However, the system transfer function H(w) of the optical communications system will normally be complex, so that an optical signal traversing the communications system will suffer distortions in both phase and amplitude. This issue is addressed by the embodiment of FIG. 4.

Figure 4:
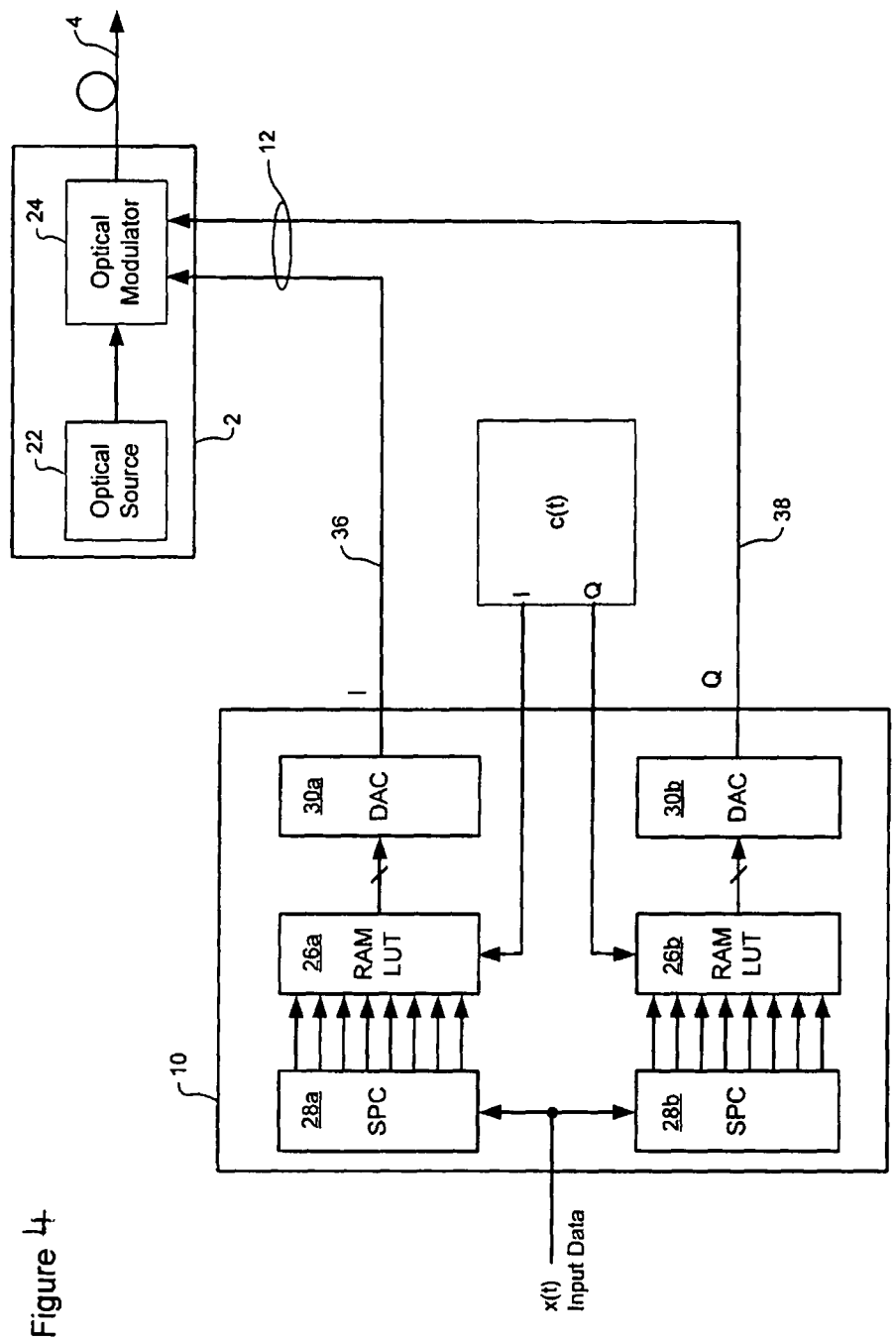
FIG. 4 is a block diagram schematically illustrating principal components and operations of a further alternative compensation modulator used in the system of FIG. 1.

FIG. 4 is a block diagram schematically illustrating an embodiment in which a multi-dimensional compensation modulator 10 is used to compensate complex system transfer function effects. In general, the multi-dimensional compensation modulator 10 provides an independent compensation path for each dimension of the communications system for which compensation is to be provided. In the embodiment of FIG. 4, it is desired to provide compensation for both amplitude and phase distortions, and therefore the multi-dimensional compensation modulator 10 comprises a pair of independent compensation paths. In this case, a pair of compensation paths generate respective output signals I and Q (at 36 and 38) that represent respective orthogonal (Cartesian) components of the predistorted signal 12. The two output signals I and Q are then supplied to a suitable multi-dimensional optical modulator 24 capable of modulating the amplitude and phase of light generated by the optical source 22 in response to the signal components I and Q of the predistorted signal 12. Various optical modulators capable of providing this functionality are known in the art, such as, for example, Mach Zehnder modulators.

As will be appreciated, the multi-dimensional compensation modulator 10 can be implemented using multiple compensation paths to generate the predistorted signal $x^1(t)$ 12 in any desired format, such as, for example, polar coordinates. The only limitation here is that a suitable optical modulator 24 must be provided for modulating the appropriate optical components in response to the signal components generated by the multi-dimensional compensation modulator 10.

Figure 5:
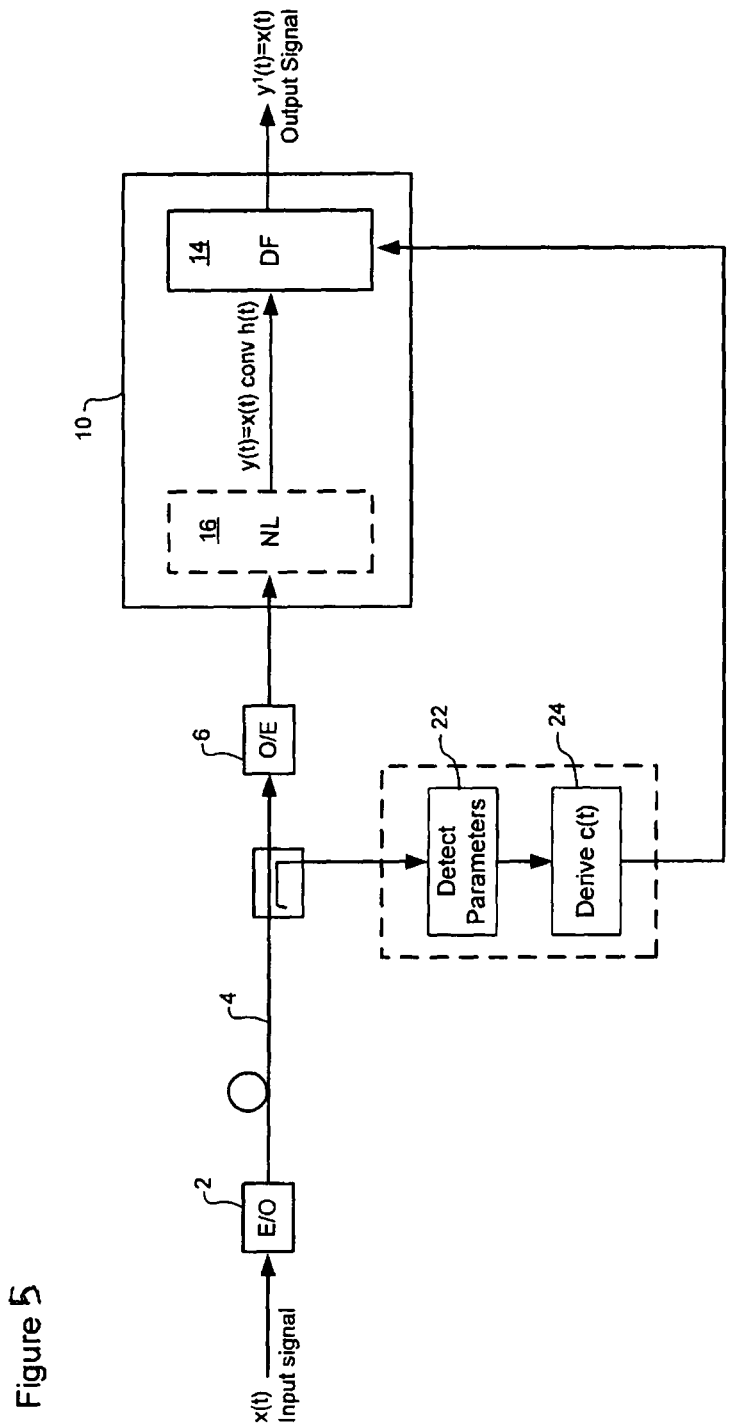
FIG. 5 is a block diagram schematically illustrating principal components and operations of a compensation modulator implemented at a receiving end of an optical communications system.

FIG. 5 shows the hardware required in the receiver when the compensation is to be carried out using the digital filtering at the receiver. Where components are used corresponding to those in FIG. 2, the same reference numerals are used and a detailed description is not repeated. The compensation module 10 is provided at the receiver but implements the same function as in the embodiment of FIG. 2.

The system can be implemented with other easily adaptable digital filtering techniques. For example, the compensation function can be implemented by a digital transversal FIR filter. Essentially, this functions as a delay line with multiple output taps. The output is based on a combination of the tap signals, with weighting applied to each tapped signal. The transversal filter function is controlled by selecting the tap combinations and scaling values, and this provides an easily changeable transfer function with many degrees of freedom. In a multiple dimension (for example I and Q) pre-compensator, each dimension will be provided with a digital transversal FIR filter.

In order to derive the filter control signals to provide the required compensation, the same procedures as described above can be used for determining the digital filter settings as used for determining the LUT values.

The system described above provides the ability to compensate for optical degradation across a network by pre-processing the signal in the electrical domain before modulation onto an optical carrier, or post processing the signal in the electrical domain after demodulation.

This invention uses this capability of electrical processing at the receiver and at the transmitter in order to provide security within the optical physical layer. In particular, the ability to pre-process and post-process in the electrical domain enables the optical signal to be essentially scrambled. In this way, the network can be arranged so that an optical signal tapped from a span in the network does not comprise a readily identifiable sequence of binary optical pulses.

Figure 6:
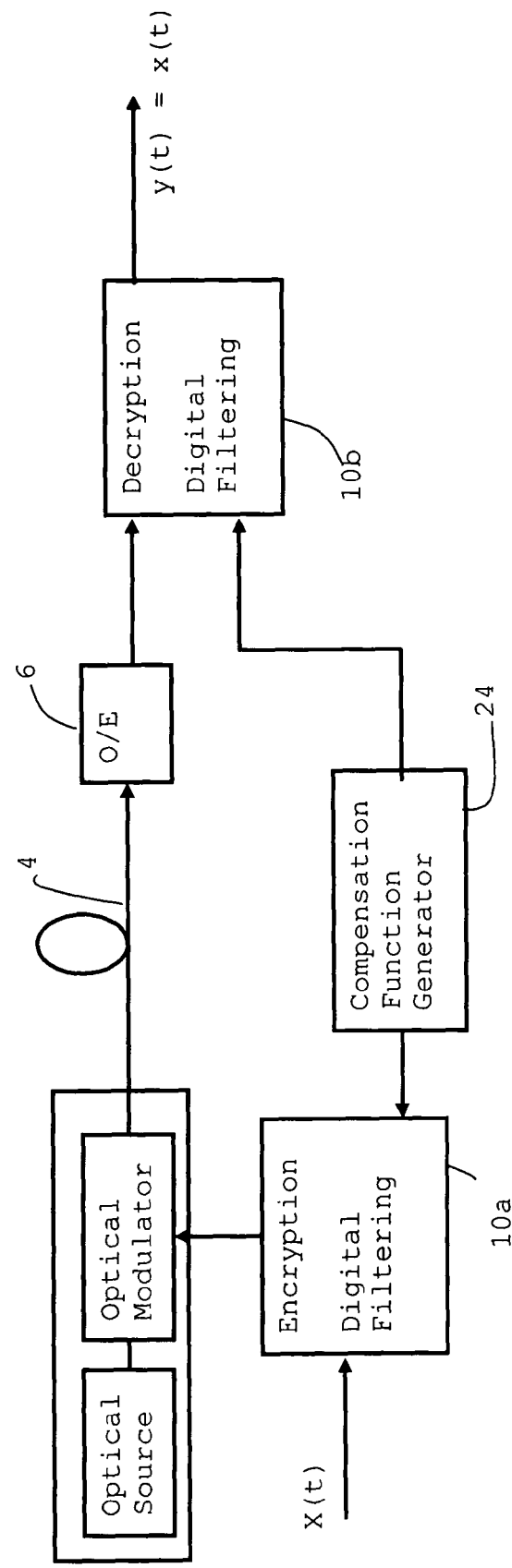
FIG. 6 is a block diagram of an optical communications system of the invention.

FIG. 6 shows a system of the invention. The compensation modulator 10a applies the encryption function to the digital electrical signal. If the input x(t) is analogue, then an A/D converter first generates a digital representation of the signal. This encryption function can be implemented by the same digital filter which is used for dispersion compensation and for compensation of non-linear effects.

A compensation function generator 24 derives the chromatic dispersion compensation function in the same way as described above. This compensation may be applied as a pre-processing operation at the transmitter or as a post-processing step at the receiver. The compensation may be shared at both ends. In FIG. 6, the compensation function generator is shown as providing a control input for the digital filter in both the transmitter and the receiver.

The compensation modulator 10b in the receiver applies the decryption function to the digital electrical signal. If a multi-level analogue output is required, a D/A converter is provided.

For some filter implementations the encryption and decryption functions can be implemented using identical hardware. However, useful simplifications are possible at the transmitter when the input signal x(t) takes only binary values. In contrast, at the receiver the analogue input must be approximated by multi-level digitized values. Transversal filter and look-up table implementations for multi-level samples require more complex digital processing. In cases where very large net chromatic dispersion must be compensated, it may be advantageous to apply most of the compensation at the transmitter, where we can take advantage of the binary signal levels. The receiver can then process a multi-level input, accounting for dispersion over a smaller number of symbols than are handled by the transmitter.

The combined effect of the filtering in the receiver and transmitter is to provide encryption of the optical physical layer signal and to provide digital electrical compensation of the dispersion (and optionally also the non-linear) effects of the optical span 4.

In its simplest form, this invention can be implemented by introducing additional chromatic dispersion in the electrical domain at the transmitter and compensating for this additional chromatic dispersion at the receiver, in addition to compensating for the optical span transfer function and (optionally) non-linearities of the optical modulator and opto-electric converter 6.

By introducing sufficient chromatic dispersion into the optical signal, the resulting pulse spreading will destroy the quantized nature of the optical signal in the optical span.

While this approach will provide a level of additional security, it will be relatively easy to reconstruct the optical signal, by applying a variable degree of chromatic dispersion to the signal, until a sequence of optical pulses is recovered. In particular, an adaptive control scheme of the type represented in FIG. 2 might be applied to the receiver compensation, and has the potential to track such changes in chromatic dispersion. More complicated encryption systems are preferably therefore implemented using the system described above.

There are two simple ways in which the electrical signal can be processed to provide scrambling in the optical domain. For linear filters, these are mathematically equivalent. Non-linear transfer functions may be implemented in either domain, and may provide additional security under some conditions.

Firstly, the digital electrical filtering can be used to implement time domain changes to the optical pulses, for example causing pulse spreading and/or phase and amplitude changes, so that adjacent pulses overlap thereby destroying the binary pulse nature of the optical signal.

Secondly, the digital electrical filtering can be used to implement frequency domain changes to the optical pulses. For this purpose, FFTs (Fast Fourier Transformations) and inverse FFTs can be used to convert the electrical signal into the frequency domain before the encryption and after the decryption operations. A pseudo randomly selected phase shift can be applied to each frequency component, which can then be removed on reception with knowledge of the pseudo random code. These frequency domain changes will destroy the quantized pulse nature of the optical signal, thereby making it difficult to intercept without knowledge of the code. Similarly, pseudo-random modulation of the amplitude of spectral components, or transfer of power between different spectral components may also be applied, although amplitude changes can degrade the noise tolerance of the signal, and will typically be less effective than phase distortions.

Information concerning the encryption function implemented by the transmitter digital filter must be conveyed to the receiver, so that the appropriate inverse function can be implemented.

It is a requirement that the transmitter and receiver both have access to the same encryption key from the start of data exchange. In some circumstances the security offered by a fixed encryption key may be sufficient. However increased security is provided if the key value is changed at intervals during the communication process. Techniques for carrying out these functions are well known and used in many encryption systems, including existing electrical encryptors operating on SONET/SDH signals. Preferably a communications mechanism between transmitter and receiver exists to allow key selection and key change synchronization to take place. Ideally this will operate at the level of the optical link, without taking bandwidth from the higher layer protocols. Such a communications link may be required to enable accurate pre-compensation of the link dispersion to take place, and this communications channel can also be used for the exchange of key information. This is not absolutely essential as it may be possible to use only a fixed key or use a pre-assigned key to start and then to move to the next key in the sequence after a pre-determined number of bits have been received. The communication between transmitter and receiver could take many forms and more than one technique could be used. Overhead in the frame format of the recovered bit sequence could be used e.g. SONET/SDH or OTN frames as defined in ITU G.709. Higher layer communications could also be used e.g. IP (interne protocol) providing that a path is provided to route the communications to the network element manager. However an optical link layer communications channel allows easier synchronization of key changes The encryption, decryption and modulation operations described above will be controlled by software, and the invention also relates to the software for performing the methods described above.

The embodiments of the invention described above are intended to be exemplary only. The scope of the invention is therefore intended to be limited solely by the scope of the appended claims.

The invention claimed is:

1. A method of encrypting an optical communications signal in an optical transmitter of an optical communications system prior to being conveyed across an optical link within the optical communications system, the method comprising:
    filtering an input data signal using an encryption function to generate an encrypted electrical signal; and
    modulating an optical source using the encrypted electrical signal to generate a corresponding encrypted optical signal for transmission through the optical communications system, wherein the encryption is selected such as to substantially remove quantized pulse definition from the optical signal.

2. A method as claimed in claim 1, further comprising determining the encryption function before filtering the input data signal.

3. A method as claimed in claim 1, further comprising:
determining a compensation function that substantially mitigates the chromatic dispersion imparted to the communications signal by the optical communications system, and wherein
filtering the input signal further uses the compensation function to generate an encrypted predistorted electrical signal.

4. A method as claimed in claim 3, wherein the step of determining a compensation function comprises:
measuring a performance parameter related to the optical dispersion; and
calculating respective values of one or more parameters of the compensation function that optimizes the measured performance parameter.

5. A method as claimed in claim 4, wherein the step of measuring the performance parameter comprises a step of measuring any one or more of net chromatic dispersion at one or more wavelengths, a bit error rate, a signal-to-noise ratio, an eye-opening ratio, a stimulus response, and a probability distribution.

6. A method as claimed in claim 5, wherein filtering the electrical input signal comprises digitally filtering the electrical input signal using any one of a Fast Fourier Transform (FFT) filter, a Finite Impulse Response (FIR) filter, and a Infinite Impulse Response (IIR) filter.

7. A method as claimed in claim 1, wherein filtering the electrical input signal comprises:
calculating successive numerical values of the encrypted signal, based on the electrical input signal and the encryption function; and
converting each successive numerical value into a corresponding analog value of the encrypted signal.

8. A method as claimed in claim 7, wherein the encrypted signal is represented by two or more orthogonal components, and the step of calculating successive numerical values of the encrypted signal comprises a step of calculating successive corresponding values of each component.

9. A optical transmission method, comprising:
encrypting an optical communications signal using a method as claimed in claim 1;
transmitting the encrypted optical signal over an optical communications link;
receiving the transmitted encrypted optical signal;
converting the received encrypted optical signal into an electrical signal; and
decrypting the electrical signal by filtering using an inverse of the encryption function.

10. A transmission method as claimed in claim 9, wherein encrypting the optical communications signal further comprises:
determining a compensation function that substantially mitigates the chromatic dispersion imparted to the communications signal by the optical communications system, and wherein
filtering the electrical input signal further uses the compensation function to generate an encrypted predistorted electrical signal.

11. A transmission method as claimed in claim 9, wherein decrypting the optical communications signal further comprises:
determining a compensation function that substantially mitigates the chromatic dispersion imparted to the communications signal by the optical communications system, and wherein
filtering the electrical input signal using an inverse of the encryption function further uses the compensation function to generate an decrypted and chromatic dispersion compensated electrical signal.

12. A method of decrypting an optical communications signal in an optical receiver of an optical communications system after it has been conveyed across an optical link within the optical communications system, the method comprising:
receiving an encrypted optical signal having no quantized symbol definition;
converting the received encrypted optical signal into an electrical signal; and
decrypting the electrical signal by filtering using an inverse of an encryption function which had been used in the transmission of the optical signal.

13. A method as claimed in claim 12, wherein decrypting the optical communications signal further comprises:
determining a compensation function that substantially mitigates the chromatic dispersion imparted to the communications signal by the optical communications system, and wherein
filtering the electrical signal using an inverse of an encryption function further uses the compensation function to generate a decrypted and chromatic dispersion compensated electrical signal.

14. An optical transmitter for encrypting an optical communications signal to be conveyed across an optical link within an optical communications system, comprising:
a transmitter digital filter for filtering an electrical input signal using an encryption function to generate a encrypted electrical signal;
an optical modulator for modulating an optical source using the encrypted electrical signal to generate a corresponding encrypted optical signal for transmission through the optical communications system, wherein the encryption is selected such as to substantially remove quantized pulse definition from the optical signal.

15. An optical transmitter as claimed in claim 14, further comprising a processor adapted to determine the encryption function.

16. An optical receiver for decrypting an optical communications signal which has been conveyed across an optical link within an optical communications system, comprising:
a receiver for receiving an encrypted optical signal having no symbol definition;
an opto-electric converter for converting the received encrypted optical signal into an electrical signal; and
a receiver digital filter for filtering the electrical signal using an inverse of an encryption function which had been used in the transmission of the optical signal.

17. An optical communications system comprising:
an optical transmitter, comprising:
a transmitter digital filter for filtering a first electrical input signal using an encryption function to generate an encrypted electrical signal; and
an optical modulator for modulating an optical source using the encrypted electrical signal to generate a corresponding encrypted optical signal for transmission through the optical communications system, wherein the encryption is selected such as to substantially remove quantized pulse definition from the optical signal;

an optical link; and an optical receiver, comprising:

an opto-electric converter for converting the received encrypted optical signal into a second electrical signal; and a receiver digital filter for filtering the second electrical input signal using the inverse of the encryption function.

18. A system as claimed in claim 17, further comprising:

a processor adapted to determine a compensation function that substantially mitigates the chromatic dispersion imparted to the communications signal by the optical communications system.

19. A system as claimed in claim 18, wherein the compensation function is implemented by the transmitter digital filter.

20. A system as claimed in claim 18, wherein the compensation function is implemented by the receiver digital filter.

21. A system as claimed in claim 18, wherein the processor comprises:

a detector for measuring a performance parameter related to the optical dispersion; and a processor for calculating respective values of one or more parameters of the compensation function that optimizes the measured performance parameter.

22. A system as claimed in claim 21, wherein the detector is adapted to measure any one or more of:

net chromatic dispersion at one or more wavelengths;

a bit error rate;

a signal-to-noise ratio; and an eye-opening ratio.

23. A system as claimed in claim 17, wherein the receiver digital filter and the transmitter digital filter comprises any one of:

a Fast Fourier Transform (FFT) filter;

a Finite Impulse Response (FIR) filter; and a Infinite Impulse Response (IIR) filter.

* * * * *